Dec. 30, 1969  G. HOFFMANN  3,487,426
DEVICE FOR TESTING ENGINE CONDITION OF VESSELS
Filed May 23, 1968
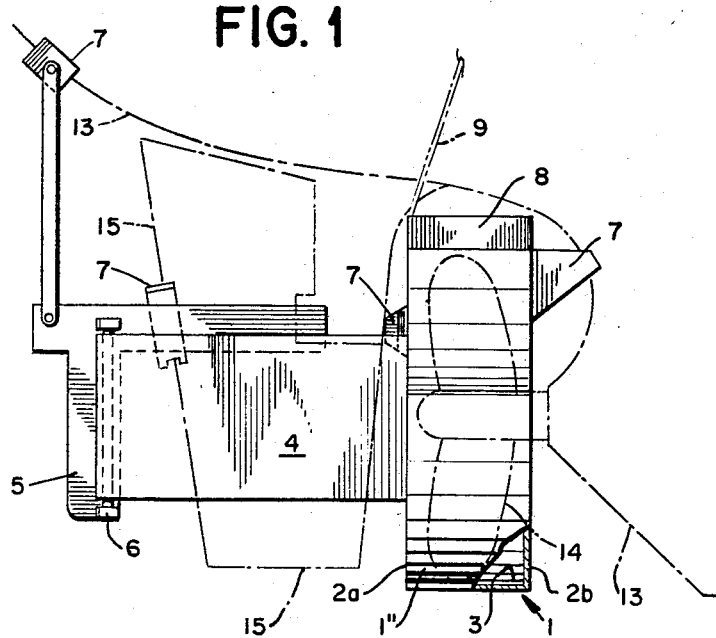
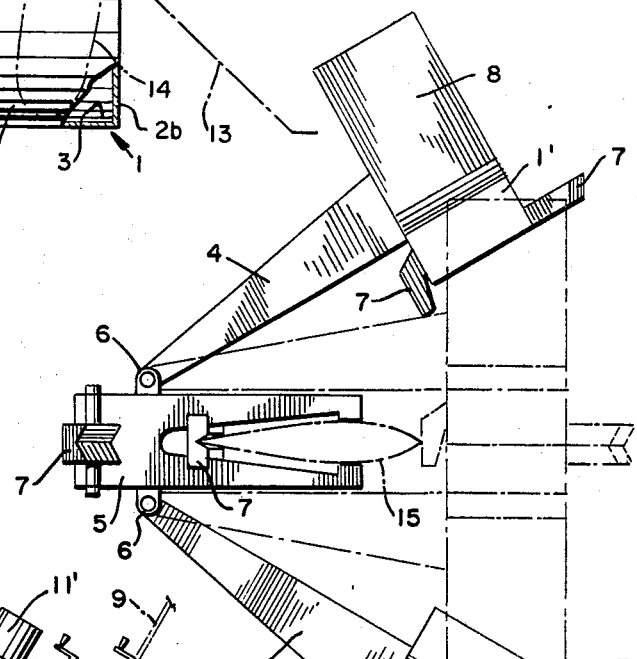
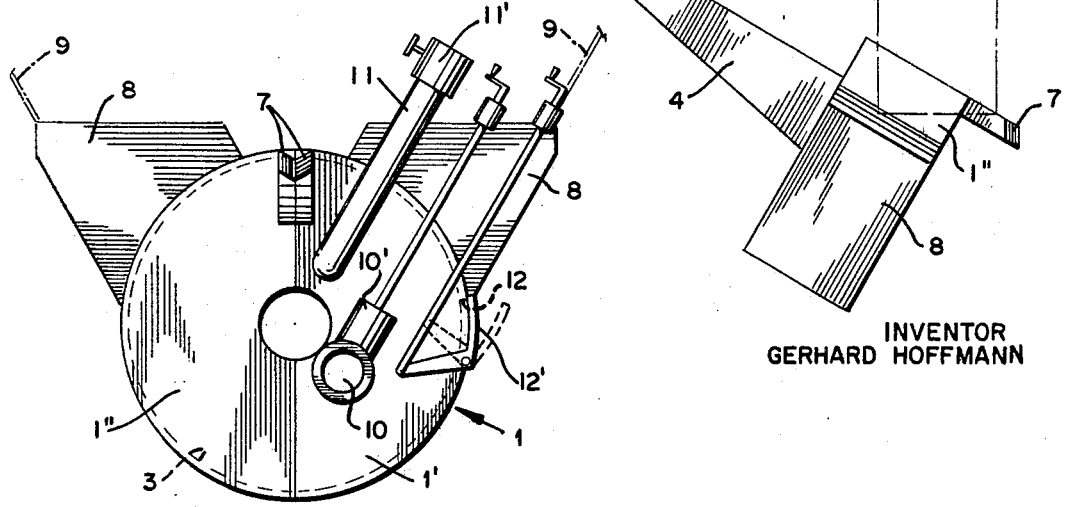
INVENTOR
GERHARD HOFFMANN United States Patent Office 3,487,426
Patented Dec. 30, 1969

3,487,426
DEVICE FOR TESTING ENGINE CONDITION
OF VESSELS
Gerhard Hoffmann, Warnemunde, Germany, assignor
to VEB Warnowwerft Warnemunde, Warnemunde,
Germany
Filed May 23, 1968, Ser. No. 731,500
Int. Cl. G01m 10/00
U.S. Cl. 73—117.1    5 Claims

ABSTRACT OF THE DISCLOSURE

The propeller of a vessel is surrounded by a cylindrical capsule which is composed of a number of separable sections. These sections are hinged on a support member and the entire device is removably attached to the vessel. The capsule is provided with separate water and air inlets and with a water outlet to control the braking effect of the water rotating within said capsule.

BACKGROUND OF THE INVENTION

Field of the invention

This invention relates in general to a device for testing engine condition of vessels, and more particularly, to a load controlling device for a ship's propeller.

In conventional testing of the engine condition of a vessel, the latter is fastened to a pier equipment or to special bollards, whereby the rotating propeller of the vessel produces a forceful water stream which may hinder the traffic in the testing area and damage the water structures.

There has been known a device for testing engine condition, consisting of a chamber enclosing the propeller and being removably attached to the vessel. By means of such a chamber, the water stream from the propeller is divided into two branch streams which are directed backwards and fed to the propeller from the front, thus creating two separate circulating streams within the chamber. In the middle of each of the two sections of the chamber, approximately at the level of the propeller blades, there has been arranged a perpendicularly positioned guide member and, behind the propeller, a stream divider with a perpendicular parting edge.

One of the disadvantages of the above described device resides in the fact that the latter takes too much space with regard to the dimensions of the propeller and also that the material and construction cost is high. The relatively large volume and high cost of these devices is the consequence of working conditions thereof. In general, the following parameters define the size and weight of the conventional devices.

The distance between the two cylindrical guiding members must be at least as great as to permit the propeller to pass freely therebetween.

The guiding members must have a diameter which corresponds with the half distance between these members.

The distance between a guiding member and the surrounding wall must be half as large as the distance between the two guiding members.

Finally, the bottom must be extremely rigid since it counteracts both the pending forces resulting from the water flow and vibrations which are hydromechanically generated by the propeller blades.

It is accordingly a primary object of the present invention to reduce cost of material and construction of these devices.

A further object of the present invention is to create a device for testing engine condition of a vessel, the size of which does not substantially exceed the diameter of the propeller.

Another object of this invention is to enable loading of the propeller and testing the engine of an immobile vessel under conditions corresponding to those which has a vessel in motion.

In accordance with a primary feature of the present invention, the above objects are attained so that a divided cylindrical capsule having a diameter which does not substantially exceed the diameter of the propeller and a length which is not larger than the open space in the stern for the propeller of the vessel, is removably attached to the vessel and is positioned around the freely rotating propeller. The divided capsule consists of a number of separable sections which are hinge-jointed by means of coupling elements to a common support member. In the swung-open position of these sections it is possible to place the unfolded capsule around the propeller and subsequently are folded the sections to create a sealed capsule which surrounds the porpeller.

For controlling the braking or loading effect of the device, there are provided in the walls of the capsule separate water and air inlet openings with adjustable control valves which enable the creation of water-air mixture within the capsule. It is also possible to install in the interior of the capsule a number of elements such as brake flaps, for instance, which produce a variable hydrodynamic resistance. The device is further provided with fastening means which removably connect the capsule and support member to the vessel. With advantage, there are utilized buoyant bodies attached to the device to thereby make the latter float at adjustable levels of submersion.

The loading or braking of the propeller results due to the vorticity and friction of the water rotating with the propeller within the capsule.

The device of this invention can be mounted to and dismounted from the vessel without any additional measures, such as for example, docking the vessel.

The invention is illustrated by way of example in the accompanying drawings which form part of the application and in which:

FIG. 1 is a schematical side view of the device of this invention;

FIG. 2 is a top view of the device of FIG. 1; and

FIG. 3 is a front view of the device of FIG. 1.

Referring now to FIG. 1, there is illustrated therein by dashed lines a stern of a vessel with a rudder 15 and propeller 14.

The device for application of a load to the propeller 14, when the vessel 13 is to be kept immobile for testing the condition of the running engine, includes a lengthwise divided cylindrical capsule 1 having a front wall 2a, a rear wall 2b and a cylindrical inner surface 3 which closely surrounds the propeller 14. In accordance with the present invention this capsule 1 is composed of a number of separable sections, in the present embodiment of two vertically divided halves 1' and 1''. In front of the front wall 2a, an elongated support member 4 is located for supporting respective capsule halves by means of hinged brackets 4 which at one end thereof are integral with the corresponding section of the capsule and, at the opposite end, hinged by hinge joints 6 to the support member 4. Due to this pivotable arrangement it is possible to swing the halves 1' and 1'' open, thus enabling the installation of the capsule around the propeller.

The support member in the present modification has a bifurcated configuration to receive the rudder 15 which is situated in front of the propeller 13. To affix removably the entire device to the vessel, the support member 4 and the capsule 1 is provided with a number of fastening elements 7, such as suspension rods, clamps and screw fasteners, by means of which the device is maintained in the desired operative position. Moreover, the capsule 1 is lashed to the vessel by ropes 9. As seen in FIG. 3, the capsule 1 is further provided at its upper portion with buoyant bodies 8 which can be either filled up with the water or pumped out for adjusting the capsule on the desired level by means of the upward hydraulic pressure.

In accordance with another feature of the present invention, the front wall 2a of the capsule has an inlet opening 10 with slide valve 10' for flooding the interior of the capsule with the water, and an air inlet pipe 11 with a cutoff valve 11' for delivering the air into the capsule, thus creating a water-air mixture therein having a reduced braking effect on the propeller. The cylindrical wall has an outlet opening 12 with a hinged cover 12' for removing the excess water or water-air mixture.

In FIG. 2, there is shown therein a top view of the device wherein respective sections 1' and 1" of the capsule are swung open. In this position the device is prepared for mounting to and dismounting from the vessel. When mounting the device, the buoyant bodies 8 keep the latter floating on the water surface and by ropes 9 it is adapted to be pulled towards the propeller. As soon as the bifurcated support member 4 receives the rudder and the open capsule 1 is properly arranged with respect to the propeller, the open sections 1' and 1" are folded down to form the closed capsule 1 surrounding the propeller and locked by any suitable locking means (not shown in the drawing). Subsequently, the device is affixed by fastening elements 7 and ropes 9 to the vessel and the testing of the engine condition of the latter may start.

To regulate the effective load of the vessel's engine, the cutoff valve 11' of the air pipe 11 is open and the incoming air is mixed with the water rotating with the propeller inside the capsule 1. Consequently, the movement of rotation and the braking effect of the device becomes reduced. On the other hand, to increase the braking action of the device, the slide valve 12' and the cover 12' are opened and the air pipe 11 closed so that the rotating propeller is loaded by the capsule operating as a rotary pump.

It will be understood that various changes may be made in the form, construction and arrangement of the several parts without departing from the spirit and scope of this invention as set forth in the appended claims.

What is claimed is:
1. A device for application of load to a drive means of a vessel creating an axially directed water jet, comprising a capsule means composed of a number of separable capsule sections and adapted for surrounding the entire drive means in closely spaced relation thereto to direct the water jet therefrom for circulation around the inside circumference of the capsule, a capsule support member located in front of said drive means, said capsule sections being respectively hinged to said capsule support member for being swung open when putting the device in operative position around said drive means; and fastening means provided on said support member and capsule means for removably affixing the latter to the vessel.

2. The device according to claim 1 wherein said capsule means comprises an adjustable water inlet means for flooding the interior of the capsule means and an adjustable air inlet means for creating a water-air mixture therein having a reduced loading effect.

3. The device according to claim 2 wherein said capsule means further comprises an adjustable water outlet means adapted for cooperation with said water inlet means and the running propeller to produce an increased braking effect by providing a water circulation within said capsule means like a rotary pump.

4. The device according to claim 1 further comprising buoyant bodies attached to said capsule means for supporting the latter on the water surface.

5. The device according to claim 1 wherein said drive means is a propeller located behind a rudder of the vessel whereby said capsule support member has a bifurcated configuration for receiving said rudder.

References Cited
FOREIGN PATENTS
45,235 10/1961 Poland.
142,902 3/1961 Russia.

RICHARD C. QUEISSER, Primary Examiner

C. E. SNEE III, Assistant Examiner

U.S. Cl. X.R.

73—148